United States Patent
Dixon

(10) Patent No.: US 12,282,728 B2
(45) Date of Patent: Apr. 22, 2025

(54) AUTOMATIC TEXT RECOGNITION WITH LAYOUT PRESERVATION

(71) Applicant: Apple Inc., Cupertino, CA (US)

(72) Inventor: Ryan S. Dixon, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 77 days.

(21) Appl. No.: 18/123,256

(22) Filed: Mar. 17, 2023

(65) Prior Publication Data
US 2023/0394222 A1 Dec. 7, 2023

Related U.S. Application Data

(60) Provisional application No. 63/349,031, filed on Jun. 3, 2022.

(51) Int. Cl.
| | | |
|---|---|---|
| *G06F 40/106* | (2020.01) | |
| *G06F 40/166* | (2020.01) | |
| *G06F 40/263* | (2020.01) | |
| *G06F 40/30* | (2020.01) | |
| *G06F 40/47* | (2020.01) | |

(Continued)

(52) U.S. Cl.
CPC .......... *G06F 40/106* (2020.01); *G06F 40/166* (2020.01); *G06F 40/263* (2020.01); *G06F 40/30* (2020.01); *G06F 40/47* (2020.01); *G06V 30/1448* (2022.01); *G06V 30/274* (2022.01); *G06V 30/414* (2022.01); *G10L 13/02* (2013.01)

(58) Field of Classification Search
CPC ...... G06F 40/106; G06F 40/47; G06F 40/166; G06F 40/263; G06F 40/30; G06V 30/414; G06V 30/1448; G10L 13/02

USPC .......................................................... 715/243
See application file for complete search history.

(56) References Cited

U.S. PATENT DOCUMENTS

| | | | | |
|---|---|---|---|---|
| 5,479,596 | A * | 12/1995 | Capps | G06F 40/189 |
| | | | | 715/244 |
| 2003/0007397 | A1* | 1/2003 | Kobayashi | G06F 40/166 |
| | | | | 365/200 |

(Continued)

FOREIGN PATENT DOCUMENTS

EP     3862918     8/2021

OTHER PUBLICATIONS

International Search Report and Written Opinion from PCT/IB2023/000351, dated Nov. 17, 2023, 10 pages.

(Continued)

*Primary Examiner* — Toan H Vu
(74) *Attorney, Agent, or Firm* — BAKERHOSTETLER

(57) ABSTRACT

Aspects of the subject technology include accessing, by an electronic device, a plurality of lines of text data and text attributes corresponding to the plurality of lines of the text data. Aspects may also include, for each respective line of the plurality of lines of the text data, determining whether the respective line and the subsequent line correspond to separate paragraphs within the text data based on a first of the text attributes that corresponds to the respective line of the plurality of lines with a second of the text attributes that corresponds to a subsequent line of the plurality of lines. Aspects may further include generating output data for the plurality of lines and performing at least one process for the plurality of lines of the text data using the generated output data.

20 Claims, 13 Drawing Sheets

(51) Int. Cl.
*G06V 30/14* (2022.01)
*G06V 30/262* (2022.01)
*G06V 30/414* (2022.01)
*G10L 13/02* (2013.01)

(56) References Cited

U.S. PATENT DOCUMENTS

| | | | | |
|---|---|---|---|---|
| 2010/0080493 | A1* | 4/2010 | McGatha | G06F 40/103 |
| | | | | 382/321 |
| 2014/0258852 | A1* | 9/2014 | Sesum | G06F 40/263 |
| | | | | 715/256 |
| 2016/0246774 | A1 | 8/2016 | Zaric et al. | |
| 2017/0123647 | A1* | 5/2017 | Zhang | G06F 3/0482 |
| 2017/0351913 | A1* | 12/2017 | Chen | G06V 30/412 |
| 2019/0130073 | A1* | 5/2019 | Sun | G16H 10/60 |
| 2021/0256253 | A1* | 8/2021 | Chen | G06F 18/214 |
| 2023/0054848 | A1* | 2/2023 | Loriant | G06V 30/36 |

OTHER PUBLICATIONS

Written Opinion from PCT/IB2023/000351, dated May 7, 2024, 7 pages.

* cited by examiner

300

302 — Introduction — 312

304 —
Lorem ipsum dolor sit amet, — 314
consectetur adipiscing elit. Nam — 316
interdum lacus orci, tincidunt faucibus — 318
tortor malesuada nec. Phasellus sit — 320
amet eros eu erat consectetur — 322
tincidunt. Nam a rhoncus ligula. In — 324
luctus nisi porttitor, mattis dolor — 326
tristique, vehicula nisl. Integer et — 328
maximus est, a porta orci. — 330

306 —
Sed nec enim at mi eleifend — 332
elementum. Vestibulum ante ipsum — 334
primis in faucibus orci luctus et — 336
ultrices posuere cubilia curae; Duis — 338
tristique erat lectus, vitae tristique — 340
diam consequat ut. Sed vehicula nisi — 342
ultrices orci semper, quis ultrices nibh — 344
commodo. Integer eget metus — 346
interdum neque fringilla gravida ac ac — 348
mi. Quisque ut libero congue, posuere — 350
lectus ac, tempus ligula. Aenean et — 352
viverra felis. Mauris quis finibus — 354
tortor. Maecenas lectus ante, — 356
fermentum non scelerisque eget, porta — 358
a libero. Sed sed luctus ipsum. — 360

308 — Section 1 — 362

310 —
Suspendisse nec sagittis enim. Donec — 364
eu faucibus metus. Integer eget libero — 366
in felis pharetra convallis quis ut — 368
lectus. Vivamus in suscipit turpis, ut — 370
pellentesque nulla. Ut ac neque quis — 372
lectus mollis interdum ac quis ante. — 374
Class aptent taciti sociosqu ad litora — 376
torquent per conubia nostra, per — 378
inceptos himenaeos. Curabitur — 380
imperdiet porttitor nibh, nec cursus — 382
urna lacinia eget. Suspendisse mollis — 384

Introduction — 312

Lorem ipsum dolor sit amet — 314
consectetur adipiscing elit. Nam — 316
interdum lacus orci, tincidunt faucibus — 318
tortor malesuada nec. Phasellus sit — 320
amet eros eu erat consectetur — 322
tincidunt. Nam a rhoncus ligula. In — 324
luctus nisi porttitor, mattis dolor — 326
tristique, vehicula nisl. Integer et — 328
maximus est, a porta orci. — 330

Sed nec enim at mi eleifend — 332
elementum. Vestibulum ante ipsum — 334
primis in faucibus orci luctus et — 336
ultrices posuere cubilia curae: Duis — 338
tristique erat lectus, vitae tristique — 340
diam consequat ut. Sed vehicula nisi — 342
ultrices orci semper, quis ultrices nibh — 344
commodo. Integer eget metus — 346
interdum neque fringilla gravida ac ac — 348
mi. Quisque ut libero congue, posuere — 350
lectus ac, tempus ligula. Aenean et — 352
viverra felis. Mauris quis finibus — 354
tortor. Maecenas lectus ante, — 356
fermentum non scelerisque eget, porta — 358
a libero. Sed sed luctus ipsum. — 360

Section 1 — 362
Suspendisse nec sagittis enim. Donec — 364
eu faucibus metus. Integer eget libero — 366
in felis pharetra convallis quis ut — 368
lectus. Vivamus in suscipit turpis, ut — 370
pellentesque nulla. Ut ac neque quis — 372
lectus mollis interdum ac quis ante. — 374
Class aptent taciti sociosqu ad litora — 376
torquent per conubia nostra, per — 378
inceptos himenaeos. Curabitur — 380
imperdiet porttitor nibh, nec cursus — 382
urna lacinia eget. Suspendisse mollis — 384

Introduction — 422

Lorem ipsum dolor sit amet, — 424
consectetur adipiscing elit. Nam — 426
interdum lacus orci, tincidunt faucibus — 428
tortor malesuada nec. Phasellus sit — 430
amet eros eu erat consectetur — 432
tincidunt. Nam a rhoncus ligula. — 434

1. In luctus nisi porttitor, mattis — 436
dolor tristique, vehicula nisl. — 438
Integer et maximus est, a porta — 440
orci. — 442 a. Sed nec enim at mi — 444
eleifend elementum. — 446

2. Vestibulum ante ipsum primis — 448
in faucibus orci luctus et — 450
ultrices posuere cubilia curae; — 452
Duis tristique erat lectus, vitae — 454
tristique diam consequat ut. — 456

Sed vehicula nisi ultrices orci — 458
semper, quis ultrices nibh — 460
commodo. — 462

3. Integer eget metus interdum — 464
neque fringilla gravida ac ac — 466
mi. Quisque ut libero congue, — 468
posuere lectus ac, tempus — 470
ligula. Aenean et viverra felis. — 472
Mauris quis finibus tortor. — 474
Maecenas lectus ante, — 476
fermentum non scelerisque — 478
eget, porta a libero. Sed sed — 480
luctus ipsum. — 482

Section 1 — 484
Suspendisse nec sagittis enim. Donec — 486
eu faucibus metus. Integer eget libero — 488

*FIG. 4B*

AUTOMATIC TEXT RECOGNITION WITH LAYOUT PRESERVATION

CROSS-REFERENCE TO RELATED APPLICATIONS

The present application claims the benefit of U.S. Provisional Patent Application Ser. No. 63/349,031, entitled "AUTOMATIC TEXT RECOGNITION WITH LAYOUT PRESERVATION," filed Jun. 3, 2022, which is hereby incorporated herein by reference in its entirety and made part of the present U.S. Utility Patent Application for all purposes.

TECHNICAL FIELD

The present description generally relates to processing text data on electronic devices, including text data from image files.

BACKGROUND

An electronic device such as a laptop, tablet, or smartphone, may be configured to access text data via a variety of formats, including images. Images may include text data that may be recognized by the electronic device.

BRIEF DESCRIPTION OF THE DRAWINGS

Certain features of the subject technology are set forth in the appended claims. However, for the purpose of explanation, several implementations of the subject technology are set forth in the following figures.

FIG. 3A depicts an example text data, in accordance with one or more implementations.

FIG. 3B depicts the example text data of FIG. 3A having bounding boxes for each line, in accordance with one or more implementations.

FIG. 4B depicts the example text data of FIG. 4A having bounding boxes for each line, in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

This present disclosure relates to using a high-order semantic understanding of text data to perform an improved processing of selected text from the text data. As a non-limiting example, this high-order semantic understanding can be used to improve copy/paste operation, a translation operation, a dictation operation, and/or any other operation that utilizes text data.

In some implementations, the text data being selected and/or copied can be formatted in columns, lists, multiple lines, and the like. For example, a web page can display a news article having multiple columns. When selecting text from the text data having various types of line layouts, it may be beneficial to understand the relationship between the lines of text so that the semantic relationships between the lines can be preserved during an operation, such as a copy/paste operation. For example, a web page for a recipe may have an "instructions" column and an "ingredients" column, and a selection from either column should preserve the semantic relationship between the two columns. In other words, copying the "instructions" column and the "ingredients" column should not concatenate the ingredients with the instructions but should preserve their separation (e.g., by separate columns) as indicated by their independent columns.

Figure 1:
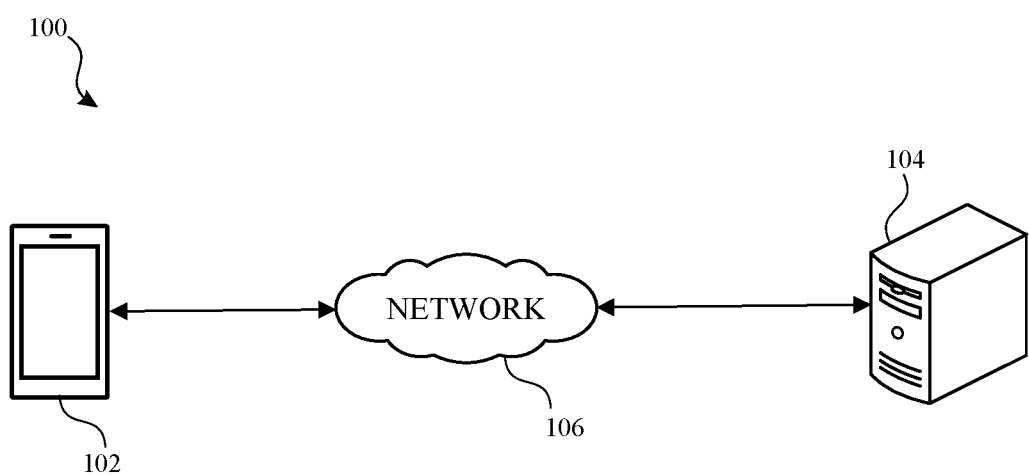
FIG. 1 illustrates an example network environment, in accordance with one or more implementations.

FIG. 1 illustrates an example network environment 100, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, the subject methods may be performed on the electronic device 102 without use of the network environment 100.

The network environment 100 may include an electronic device 102 and one or more servers (e.g., a server 104). The network 106 may communicatively (directly or indirectly) couple the electronic device 102 and the server 104. In one or more implementations, the network 106 may be an interconnected network of devices that may include, or may be communicatively coupled to, the Internet. For explanatory purposes, the network environment 100 is illustrated in FIG. 1 as including the electronic device 102 and the server 104; however, the network environment 100 may include any number of electronic devices and/or any number of servers communicatively coupled to each other directly or via the network 106.

The electronic device 102 may be, for example, a desktop computer, a portable computing device such as a laptop computer, a smartphone, a peripheral device (e.g., a digital camera, headphones), a tablet device, standalone videoconferencing hardware, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 102 may include a text recognition module (and/or circuitry) and one or more applications. In FIG. 1, by way of example, the electronic device 102 is depicted as a smartphone. The electronic device 102 may be, and/or may include all or part of, the electronic system discussed below with respect to FIG. 7. In one or more implementations, the electronic device 102 may include a camera and a microphone and may generate and/or provide data (e.g., images or audio) for accessing (e.g., identifying) text data for processing (e.g., via a processor or the server 104).

Figure 2:
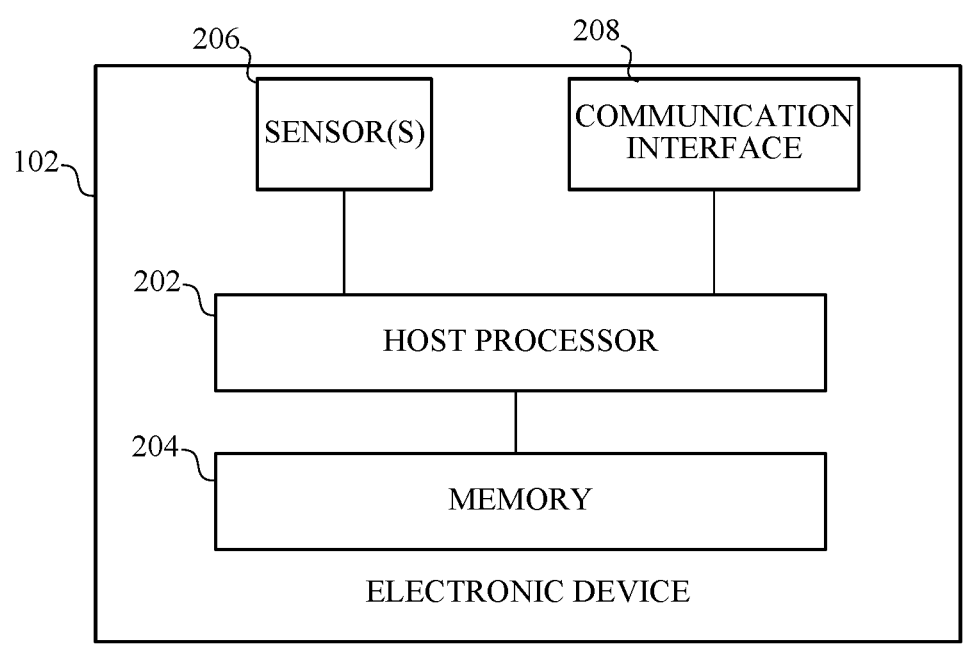
FIG. 2 depicts an example electronic device that may implement the subject methods and systems, in accordance with one or more implementations.

FIG. 2 depicts an electronic device 102 that may implement the subject methods and systems, in accordance with one or more implementations. For explanatory purposes, FIG. 2 is primarily described herein with reference to the electronic device 102 of FIG. 1. However, this is merely illustrative, and features of the electronic device of FIG. 2 may be implemented in any other electronic device for implementing the subject technology (e.g., the server 104). Not all of the depicted components may be used in all implementations, however, and one or more implementations may include additional or different components than those shown in FIG. 2. Variations in the arrangement and type of the components may be made without departing from the spirit or scope of the claims as set forth herein. Additional components, different components, or fewer components may be provided.

The electronic device 102 may include one or more of a host processor 202, a memory 204, one or more sensor(s) 206, and/or a communication interface 208. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. The host processor 202 may further implement an operating system or may otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage. The memory 204 may store machine-readable instructions for performing methods described herein. In one or more implementations, the memory 204 may store text data (e.g., as provided by the server 104). The memory 204 may further store portions of text data for intermediate storage (e.g., in buffers) as the text data is being processed.

The sensor(s) 206 may include one or more microphones and/or cameras. The microphones may obtain audio signals corresponding to text data. The cameras may be used to obtain image files corresponding to text data. For example, the cameras may obtain images of an object having text, which may be processed into text data that can be utilized by the host processor 202 for a copy/paste operation.

The communication interface 208 may include suitable logic, circuitry, and/or code that enables wired or wireless communication, such as between the electronic device 102 and the server 104. The communication interface 208 may include, for example, one or more of a Bluetooth communication interface, an NFC interface, a Zigbee communication interface, a WLAN communication interface, a USB communication interface, a cellular interface, or generally any communication interface.

In one or more implementations, one or more of the host processor 202, the memory 204, the sensor(s) 206, the communication interface 208, and/or one or more portions thereof may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

FIG. 3A depicts an example text data 300 that may be selected, copied, pasted, etc., in accordance with one or more implementations. The text data 300 may be retrieved from a file, stored in a data structure, recognized from a photo, or from any other medium that includes text. The text data 300 may include paragraphs 302-310 that represent discrete sections (e.g., a heading, sub-heading, collection of lines, and/or the like) of the text data 300 separated by a line space (e.g., a line break character) between each other. The paragraphs 302-310 may include one or more lines. For example, paragraph 302 includes line 312, paragraph 304 includes lines 314-330, paragraph 306 includes lines 332-360, paragraph 308 includes line 362, and paragraph 310 includes lines 364-384.

Although the lines of, for example, paragraph 304 are illustrated in FIG. 3A as having a line break in between them, a semantic-based understanding of the text data 300 allows the subject system to disambiguate between line breaks that are inherent in the text data 300, such as the line break at the end of the paragraph 304, and the line breaks in the text data 300 that are a result of the formatting of the text data 300, such as the line breaks at the end of each line 314-328. Thus, in the subject system, the line breaks inherent in the text data 300 can be preserved while the line breaks resulting from the particular formatting of the text data 300 can be discarded.

FIG. 3B depicts the example text data 300 of FIG. 3A having bounding boxes for each line 312-384, in accordance with one or more implementations. Each of lines 312-384 may be determined to correspond to one of the paragraphs 302-310 based on semantic information and/or geometric information corresponding to each of the lines 312-384.

The semantic information may include, for example, punctuation, symbols, capitalization, a word count, part of speech tags (e.g., noun, verb, adjective, etc. as determined by natural language processing part of speech tagging algorithm), and/or any other information relating to the semantics of the text data. For example, line 328 and line 330 may correspond to the same paragraph because line 328 does not end with a period, whereas line 330 and line 332 may correspond to different paragraphs because line 330 ends with a period. Line 330 and line 332 may also correspond to different paragraphs because line 332 begins with a capital letter. As another example, if a line ends with a preposition, it likely should be merged with the following line, as lines typically do not end with prepositions. However, a line ending in a period, a line starting with a capital letter, and/or a line ending with a preposition may not alone dispositively identify different paragraphs.

The geometric information may include line starting location, line height, line spatial orientation, line length, line spacing, and/or any other information relating to the geometry of lines. In one or more implementations, a machine learning model may be trained with lines that are encompassed by bounding boxes to output a bounding box corresponding to a line used as input. The bounding boxes may be displayed or not displayed to the user. The bounding boxes may be used to reflect the geometric information of a line. For example, lines 314-330 may be determined to belong to the same paragraph because they are substantially the same size (e.g., height), have substantially the same spatial orientation, and have substantially the same starting location. Although line 312 has the same starting location, it has a different size (e.g., height) relative to the neighboring lines, which may indicate that line 312 is a header. Although lines 332-360 have the same starting location, they are separated from line 330 by a line space.

Figure 3C:
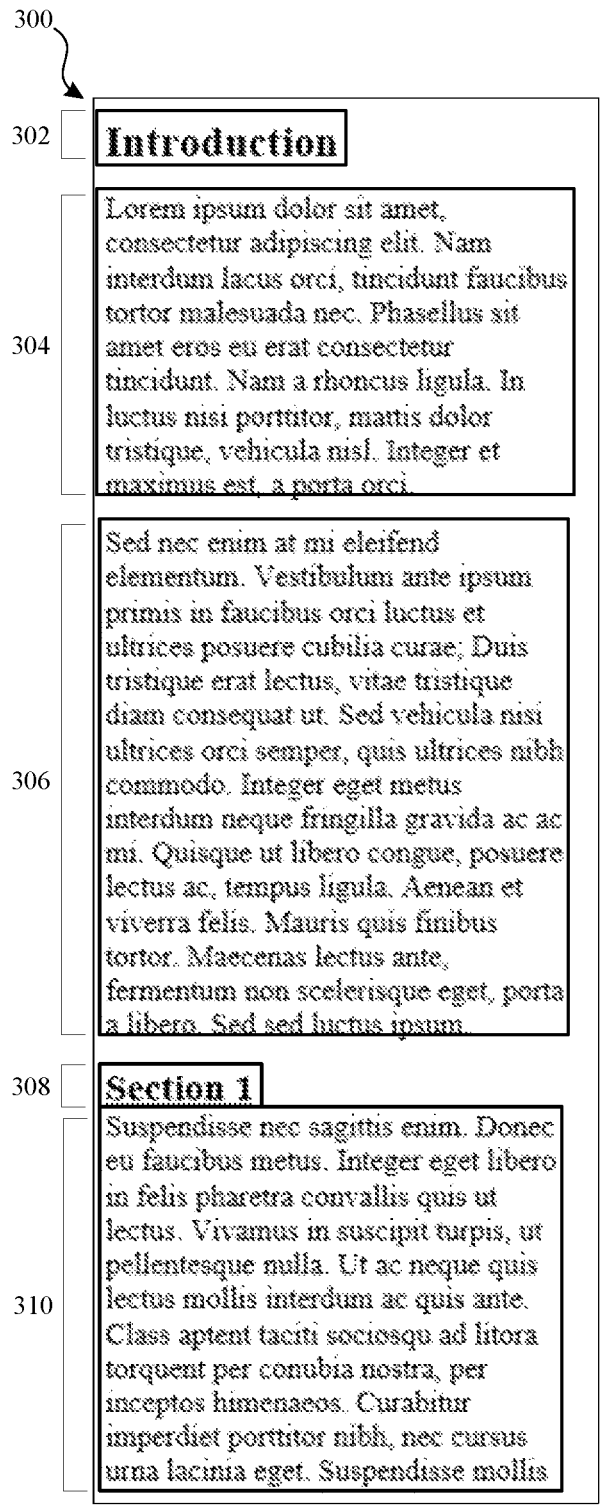
FIG. 3C depicts the example text data of FIG. 3A having bounding boxes for each paragraph, in accordance with one or more implementations.

FIG. 3C depicts the example text data 300 of FIG. 3A having bounding boxes around each of paragraphs 302-310, in accordance with one or more implementations. Pairs of sequential lines 312-384 may be analyzed to determine whether the pair corresponds to separate paragraphs. In one or more implementations, the lines of the text data 300 may be merged (e.g., separated by a space character) when the analysis determines that the lines correspond to the same paragraph, and a line break may be inserted (or maintained) when the analysis determines that a line corresponds to an end of a paragraph. In one or more implementations, the text data 300 may be analyzed and corresponding metadata may be generated to indicate which lines 312-384 belong to the same paragraphs 302-310, and/or to indicate when a line corresponds to an end of a paragraph (and/or start of a paragraph). In one or more implementations, the bounding boxes of lines 312-384 may be merged based on the determined paragraph separations resulting in bounding boxes corresponding to paragraphs 302-310. The analysis process may occur over multiple passes, merging lines into paragraphs until the lines may no longer be merged. The analysis process of the lines 312-384 is discussed in more detail with respect to FIG. 5 and FIG. 6.

Figure 3D:
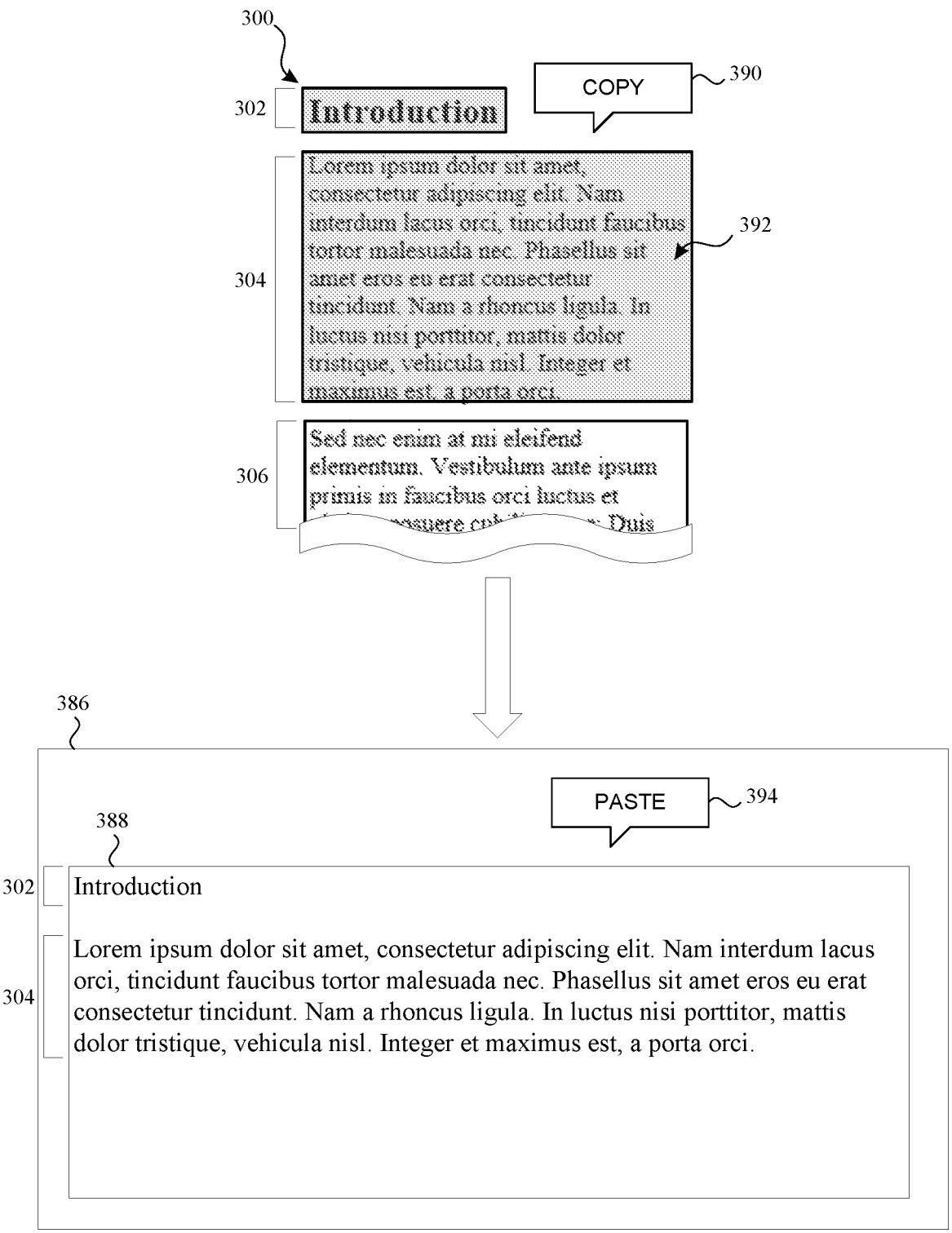
FIG. 3D depicts example operations with the example text data of FIG. 3A, in accordance with one or more implementations.

FIG. 3D depicts example operations (e.g., copy operation 390 and paste operation 394) with the example text data 300 of FIG. 3A, in accordance with one or more implementations. After the lines 312-384 are analyzed, output data may be generated for the lines 312-384 indicating which of the lines 312-384 of the text data 300 correspond to separate paragraphs. The output data may be used to create a data structure (e.g., a buffer) having the text data 300 divided into paragraphs 302-310 according to the output data. In one or more implementations, the output data may be used to modify the text data 300 when an operation is being performed with the text data 300.

For example, an operation may include a copy operation 390 and a paste operation 394. A user may select portions of the text data 300, such as paragraph 302 and paragraph 304, as shown by the selection indicator 392. The user may make a selection by touching, clicking, or generating any other input with the electronic device (e.g., the electronic device 102). The user may initiate the copy operation 390 by tapping, clicking, or generating any other input with the electronic device on the selection indicator 392, for example, and selecting the copy operation 390. When the copy operation 390 is initiated, the electronic device may duplicate the text data selected by the selection indicator 392 from the data structure to a clipboard such that it is semantically formatted (e.g., by paragraphs) rather than formatted as the text is displayed (e.g., each line is treated as a separate paragraph). In one or more implementations, when the copy operation 390 is initiated, the electronic device may copy the text data formatted as shown, as well as the corresponding output data, and apply the output data such that the text data selected by the selection indicator 392 is semantically formatted when the operation is complete (e.g., the selected text data is in the clipboard with the semantic-based formatting).

To perform a paste operation 394, the user may change to an application 386 having an input box 388 and tap, click, or generate any other input with the electronic device on the input box 388 and select the paste operation 394. In a typical paste operation, the text data selected by the selection indicator 392 may appear in the input box 388 such that each line 312-384 is formatted as presented to the user (e.g., is treated as a separate paragraph). In the paste operation 394 corresponding to the analysis of the subject technology, the text data selected by the selection indicator 392 may appear in the input box 388 such that the text selected by the selection indicator 392 is semantically formatted (e.g., by paragraphs). For example, paragraph 302 is separate from paragraph 304, and each line of paragraph 304 is merged into the paragraph 304 (e.g., and also each line being separated by a line space which may be inserted by the subject system as needed) such that a new line character is placed at the end of the paragraph 304.

Figure 4A:
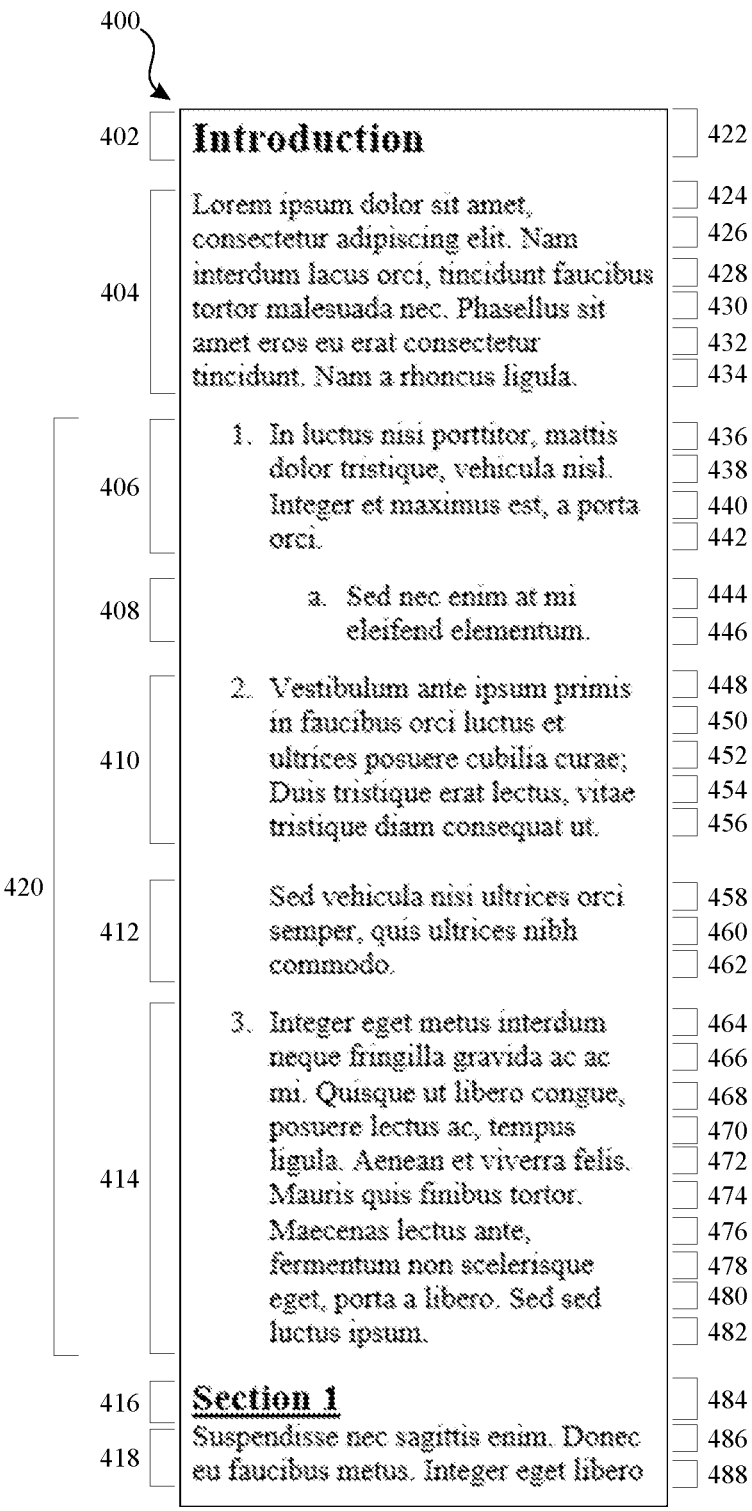
FIG. 4A depicts an example text data having a list, in accordance with one or more implementations.

FIG. 4A depicts an example text data 400 having a list 420, in accordance with one or more implementations. The text data 400 may be retrieved from a file, stored in a data structure, recognized from a photo, or from any other medium including text. The text data 400 may include paragraphs 402-418 that represent discrete sections (e.g., a heading, sub-heading, collection of lines, lists, and/or the like) of the text data 400 separated by a respective line space (e.g., a line break character) between each other. The paragraphs 402-418 may include one or more lines. For example, paragraph 402 includes line 422, paragraph 404 includes lines 424-434, paragraph 406 includes lines 436-442, paragraph 408 includes lines 444-446, paragraph 410 includes lines 448-456, paragraph 412 includes lines 458-462, paragraph 414 includes lines 464-482, paragraph 416 includes line 484, and paragraph 418 includes lines 486-488.

FIG. 4B depicts the example text data 400 of FIG. 4A having bounding boxes for each line, in accordance with one or more implementations. Each of lines 422-488 may be determined to correspond to one of paragraphs 402-418 based on semantic information and/or geometric information corresponding to each of the lines 422-488.

The semantic information may include punctuation, symbols, capitalization, a word count, part of speech tags, and/or any other information relating to the semantics of the text data. For example, line 424 and line 426 may correspond to the same paragraph because line 424 does not end with a period, whereas line 434 and line 436 may correspond to different paragraphs because line 434 ends with a period. Line 434 and line 436 may also correspond to different paragraphs because line 436 begins with a capital letter. In one or more implementations, the semantic information of lines 436-482 may indicate that the lines belong to a list. For example, the lines 436, 444, 448, 464 begin with list item indicators (e.g., 1, 2, 3). The sequential numerical list item indicators may indicate that paragraphs 406, 410, 414 belong to the same list. Although the list item indicator corresponding to paragraph 408 is sequential, it is alphabetical and thus may indicate that it is part of a separate list (e.g., a sub-list).

The geometric information may include line starting location, line height, line spatial orientation, line length, line spacing, and/or any other information relating to the geometry of lines. In one or more implementations, a machine learning model may be trained with lines and corresponding bounding boxes to output a bounding box corresponding to a line used as input. The bounding boxes may be displayed or not displayed to the user. The bounding boxes may be used to reflect the geometric information of a line. For example, lines 424-434 may belong to the same paragraph 404 because they are the same size (e.g., length and/or height), have the same spatial orientation, and have the same starting location. Although line 422 has the same starting location, it has a different size (e.g., height) relative to the neighboring lines, which may indicate that line 422 is a header. Although lines 486-488 have the same starting location, they are separated from lines 424-434 by lines 436-482 that do not have the same starting location. The geometric information of lines 436-482 may indicate that they belong to a list. For example, the lines 436-442, 448-482 all have the same second line starting location (e.g., an indented line starting location). The second line starting location may indicate that paragraphs 406, 410, 412, 414 belong to the same list. The paragraph 408 has a third line starting location (e.g., a doubly-indented line starting location), which may indicate that it is part of a separate list (e.g., a sub-list).

Figure 4C:
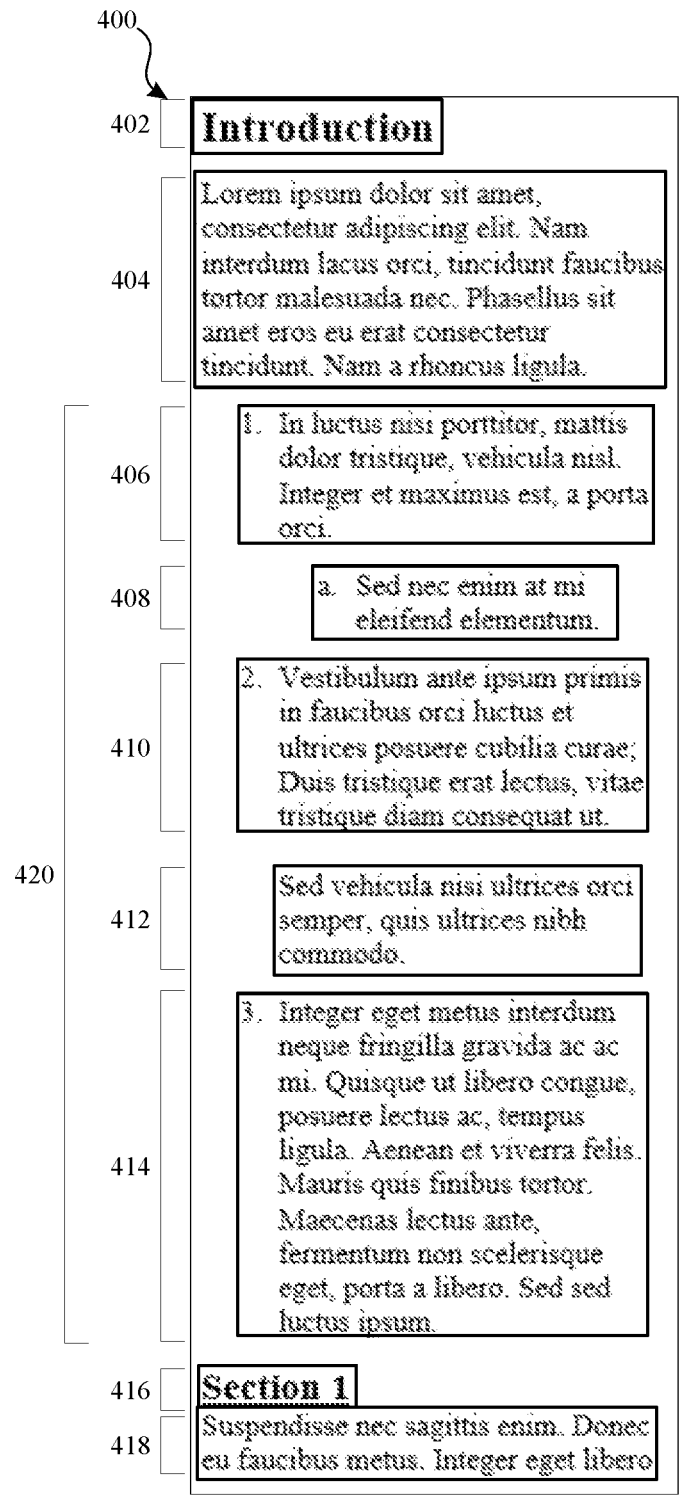
FIG. 4C depicts the example text data of FIG. 4A having bounding boxes for each paragraph, in accordance with one or more implementations.

FIG. 4C depicts the example text data 400 of FIG. 4A with bounding boxes encompassing each of paragraphs 402-418, in accordance with one or more implementations. Pairs of lines 422-488 may be analyzed to determine whether the pair corresponds to separate paragraphs. In one or more implementations, the lines of the text data 400 may be merged (e.g., separated by a space character) when the analysis determines that the lines correspond to the same paragraph, and a line break may be inserted (or maintained) when the analysis determines that a line corresponds to an end of paragraph. In one or more implementations, the text data 400 may be analyzed and corresponding metadata may be generated to indicate which lines 422-488 belong to the same paragraph 402-418. In one or more implementations, the bounding boxes of lines 422-488 may be merged based on the determined paragraph separations resulting in bounding boxes corresponding to paragraphs 402-418. The analysis process of the lines 422-488 is discussed in more detail with respect to FIG. 5 and FIG. 6.

Figure 4D:
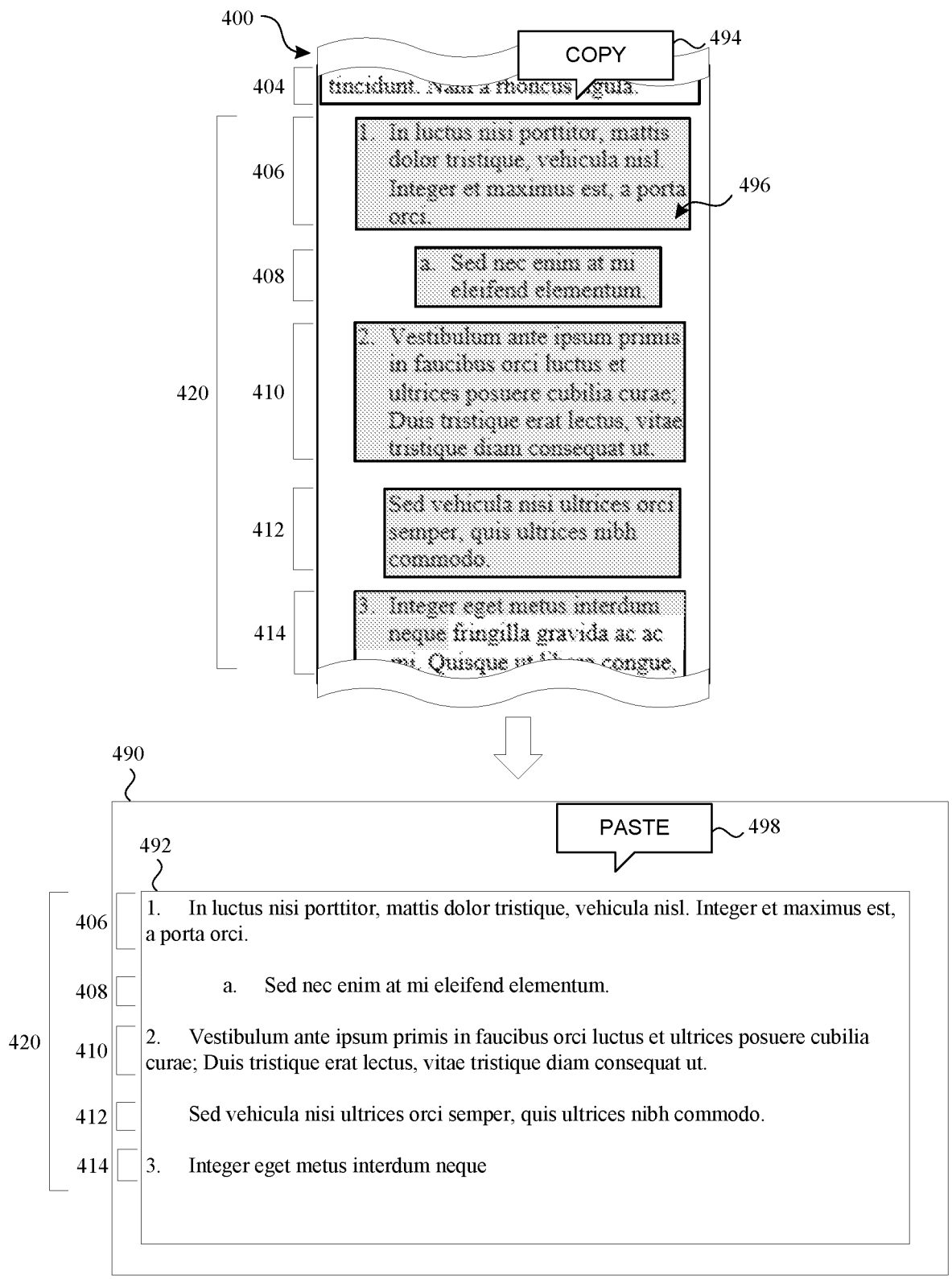
FIG. 4D depicts example operations with the example text data of FIG. 4A, in accordance with one or more implementations.

FIG. 4D depicts example operations (e.g., copy operation 494 and paste operation 498) with the example text data 400 of FIG. 4A, in accordance with one or more implementations. After the lines 422-488 are analyzed, output data may be generated for the lines 422-488 indicating which of the lines 422-488 of the text data 400 correspond to separate paragraphs and/or lists. The output data may be used to create a data structure (e.g., a buffer) having the text data 400 divided into paragraphs 402-418 and/or lists (e.g., list 420) according to the output data. In one or more implementations, the output data may be used to modify the text data 400 as an operation is being performed with the text data 400.

An operation may include a copy operation 494 and a paste operation 498. A user may select portions of the text data 400, such as paragraphs 406-412 and a portion of paragraph 414, as shown by the selection indicator 496. The user may make a selection by touching, clicking, or generating any other input with the electronic device (e.g., the electronic device 102). The user may initiate the copy operation 494 by tapping, clicking, or generating any other input with the electronic device on the selection indicator 496, for example, and selecting the copy operation 494. When the copy operation 494 is initiated, the electronic device may duplicate the text data selected by the selection indicator 496 from the data structure to a clipboard such that it is semantically formatted (e.g., by paragraphs and lists) rather than formatted as shown (e.g., each line is treated as a separate paragraph). In one or more implementations, when the copy operation 494 is initiated, the electronic device may copy the text data formatted as shown, as well as the corresponding output data, and apply the output data such that the text data selected by the selection indicator 496 is semantically formatted when the operation is complete (e.g., the selected text data is in the clipboard with the semantic-based formatting).

To perform a paste operation 498, the user may change to an application 490 having an input box 492 and tap, click, or generate any other input with the electronic device on the input box 492 and select the paste operation 498. In a typical paste operation, the text data selected by the selection indicator 496 may appear in the input box 492 such that each line 422-488 is formatted as presented to the user (e.g., is treated as a separate paragraph). In the paste operation 498 corresponding to the analysis of the subject technology, the text data selected by the selection indicator 496 may appear in the input box 492 such that the text selected by the selection indicator 496 is semantically formatted (e.g., by paragraphs and lists). For example, paragraph 406 is separate from paragraph 408, and each line of paragraph 406 is merged into the paragraph 406 such that a new line character is placed at the end of the paragraph 406. In one or more implementations, the text data selected by the selection indicator 496 may be pasted in a format (e.g., rich text format) such that lists (e.g., list 420) and sub-lists are formatted with a list format.

Figure 5:
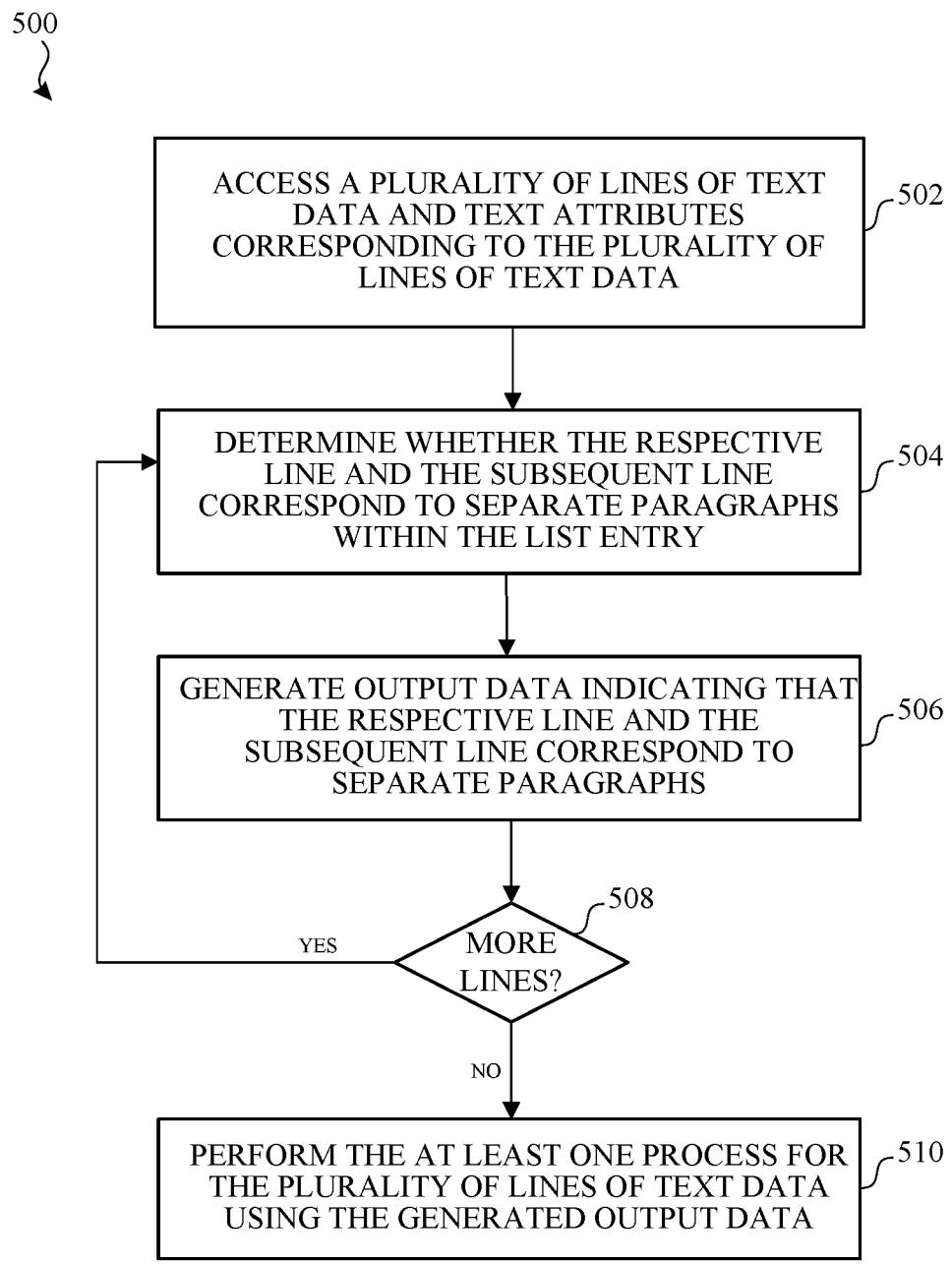
FIG. 5 depicts a flow diagram of an example process for processing text data, in accordance with one or more implementations.

FIG. 5 depicts a flow diagram of an example process 500 for processing text data, in accordance with one or more implementations. For explanatory purposes, the process 500 is primarily described herein with reference to the electronic device 102 of FIG. 1. However, the process 500 is not limited to the electronic device 102, and one or more blocks of the process 500 may be performed by one or more other components of the electronic device 102 and/or other suitable devices. Further, for explanatory purposes, the blocks of the process 500 are described herein as occurring sequentially or linearly. However, multiple blocks of the process 500 may occur in parallel. In addition, the blocks of the process 500 need not be performed in the order shown and/or one or more blocks of the process 500 need not be performed and/or can be replaced by other operations. In one or more implementations, an application stored on the electronic device 102 performs the process 500 by calling APIs provided by the operating system of the electronic device 102. In one or more implementations, the operating system of the electronic device 102 performs the process 500 by processing API calls provided by the application stored on the electronic device 102. In one or more implementations, the application stored on the electronic device 102 fully performs the process 500 without making any API calls to the operating system of the electronic device 102.

At block 502, a plurality of lines (e.g., lines 312-384) of text data (e.g., text data 300) may be accessed. An electronic device (e.g., the electronic device 102) may access the plurality of lines and/or the corresponding text attributes from a data structure, such as a file. In one or more implementations, accessing the plurality of lines may include receiving a file, recognizing text data, and accessing the recognized text data. For example, the electronic device may receive an image of an object having text, perform text recognition on the image (e.g., via an image processing algorithm), and access the text data from the image having recognized text. As another example, a server (e.g., the server 104) may receive an image of an object having text and perform text recognition on the image (e.g., via an image processing algorithm), and the electronic device may access the text data via the server.

The text attributes corresponding to the plurality of lines of the text data may also be accessed. The text attributes of the text data may include semantic information and/or geometric information. The semantic information may include punctuation, symbols, capitalization, a word count, part of speech tags, and/or any other information relating to the semantics of the text data. The geometric information may include line starting location, line height, line spatial orientation, line length, line spacing, and/or any other information relating to the geometry of lines as displayed/formatted in the file, image, etc. In one or more implementations, accessing the text attributes may include receiving an image that includes the plurality of lines of the text data and generating one or more bounding boxes (e.g., via an image processing algorithm) associated with one or more lines of the plurality of lines of the text data.

In one or more implementations, the electronic device may determine a language corresponding to the text data so that the process 500 may be performed based on the reading order that corresponds with the language. For example, the electronic device may utilize a natural language processing model (e.g., a language detection model) to determine that the language of the text data is traditional Chinese and modify the process 500 such that the lines of text are analyzed from right to left (because the lines are vertical) as opposed to top to bottom (if the lines are horizontal).

At block 504, it may be determined whether the respective line and the subsequent line correspond to separate paragraphs within the text data. The determination may be based on a first of the text attributes that corresponds to the respective line with a second of the text attributes that corresponds to the subsequent line. The determination may be made by an ensemble of heuristics, a trained machine learning model, or any suitable method to determine whether the lines belong to separate paragraphs. If two lines of text (e.g., the respective and subsequent lines) belong to separate paragraphs, a line space (e.g., a line break) may be inserted between the two lines of text. If two lines of text belong to the same paragraphs, a space (e.g., a space character) may be inserted (or replace an existing line break) between the two lines of text.

Heuristics and/or signals that can be used to make such determination may include, but are not limited to, language-specific heuristics, grouping tags (e.g., bounding boxes) applied to the lines, spatial orientation of identified groupings within the selected text, natural language processing results, and the like. For example, a natural language processing algorithm may perform part of speech tagging on at least the first and last words of each line and heuristics may include rules for parts of speech that are likely to be merged. Such rules may include, merging two lines if the first line ends with a preposition. As another example, a computer vision algorithm may apply bounding boxes to each line and heuristics may include rules such that lines having the same starting position, height, and/or orientation are likely to be merged.

A machine learning model may be trained using training data that includes lines of text having labels indicating text attributes and a corresponding determination (e.g., a probability) of whether pairs of the lines of text have matching text attributes (e.g., semantic information and/or geometric information). Accordingly, inputs to the machine learning model may include a pair of lines and text attributes of each line, and an output to the machine learning model may include a determination of whether the pairs of lines have matching attributes. For example, each pair of lines of the lines of text may be marked (e.g., in metadata) as having a particular set of text attributes via the output of the machine learning model, and lines may be merged or separated into paragraphs according to their marking.

In one or more implementations, a machine learning model may also or instead be trained using training data that includes lines of text having labels indicating text attributes and a corresponding determination of whether pairs of the lines of text correspond to the same paragraph. Accordingly, inputs to the machine learning model may include a pair of lines and text attributes of each line, and an output to the machine learning model may include a likelihood/probability of whether the pairs of lines correspond to the same paragraph and/or different paragraphs. For example, the selected text may be segmented into groups, spatial information associated with the identified groups may be collected, and natural language processing may be performed on the selected text (in accordance with rules for the language corresponding to the text), and the spatial information and natural language processing results may be used as inputs to a trained machine learning model for determining whether the input lines of text likely belong to separate paragraphs.

At block 506, output data may be generated for the plurality of lines. The output data may indicate which lines of the plurality of lines of the text data correspond to separate paragraphs. For example, the output data may be instructions for merging lines or metadata that identify lines as belonging to the same paragraph. The output data may be generated by one or more machine learning models, heuristics, or any other suitable methods for determining whether a space (e.g., a line break or space character) should be inserted between two lines of text (e.g., the respective and subsequent lines). Additionally or alternatively, the output data may include the lines of text corresponding to the indication of which lines of the plurality of lines of text data correspond to separate paragraphs. In one or more implementations, the output data includes the lines of text having line breaks added or removed as appropriate to place the lines in separate paragraphs as well as lines of text having space characters added or removed as appropriate to place the lines in the same paragraph. In one or more implementations, the output data may be incrementally generated such that more data is added to the output data as the process 500 iterates through each line of the plurality of lines of the text data.

At block 508, it is determined whether there are more lines to analyze. In one or more implementations, each line of the text data may be analyzed. For example, each line of the text data may be analyzed as an image is received so that a user may utilize the text data in the image after the image is opened. In one or more implementations, only a selection of lines of the text data may be analyzed. For example, a selection of lines of the text data corresponding to a portion of an image may be analyzed as an image is loaded, rendered, and/or the like so as to reduce the computational burden on the electronic device. If there are more lines to analyze, the process 500 may return to block 504. If there are no more lines to analyze, the process may proceed to block 510.

At block 510, at least one process may be performed for the plurality of lines of the text data using the generated output data. In one or more implementations, the plurality of lines of the text data may be modified according to the output data and copied to a clipboard. For example, the output data may include metadata describing which lines belong to the same paragraph and/or different paragraphs and the plurality of lines of text data may be modified by adding or removing line breaks between lines as necessary to place lines in the same paragraph according to the metadata.

In one or more implementations, a process may be a copy/paste operation. For example, a user may select one or more lines of text, or portions thereof, and execute a copy operation (e.g., the copy operation 390) thereby copying the selection to a clipboard. The selection may have line breaks inserted or removed as necessary to place lines within the selection in separate paragraphs as shown in the text data. The selection may also have character spaces inserted at the end of one or more lines, as needed, to prevent words from two separate lines being merged together. The selection may also or instead have metadata that indicates that lines within the selection belong in separate paragraphs. When a paste operation (e.g., the paste operation 394) is performed, the selection may be pasted such that the selection is arranged in paragraphs as shown in the text data (e.g., as laid out in an image).

In one or more implementations, the output data may be provided to an application or a system process. An application or system process may include a file. For example, the output data may be written to a text file. An application or system process may also or instead include a data structure. For example, the output data may be written to a buffer in memory. An application or system process may also or instead include a translation process. For example, a machine learning model trained to translate a first language to a second language may receive as input the output data including text data in the first language and output the text data in the second language. An application or system process may also or instead include a dictation process. For example, the output data may correspond to text data in an audio format and be used as an input to a machine learning model trained to convert speech to text. An application or system process may also or instead include a narration process. For example, the output data may be used as input to a machine learning model trained to convert text into an audio format in accordance with the output data, where the audio reads the text as continuous sentences for lines corresponding to the same paragraph. An application or system process may also or instead include a virtual assistant process. For example, the output data may be used as a request to a virtual assistant that processes the request. In one or more implementations, the processes may be incorporated with one another. For example, the narration process may receive the output data for narration and pass it to the audio generation process to generate an audio file for narrating the text data corresponding to the output data.

Figure 6:
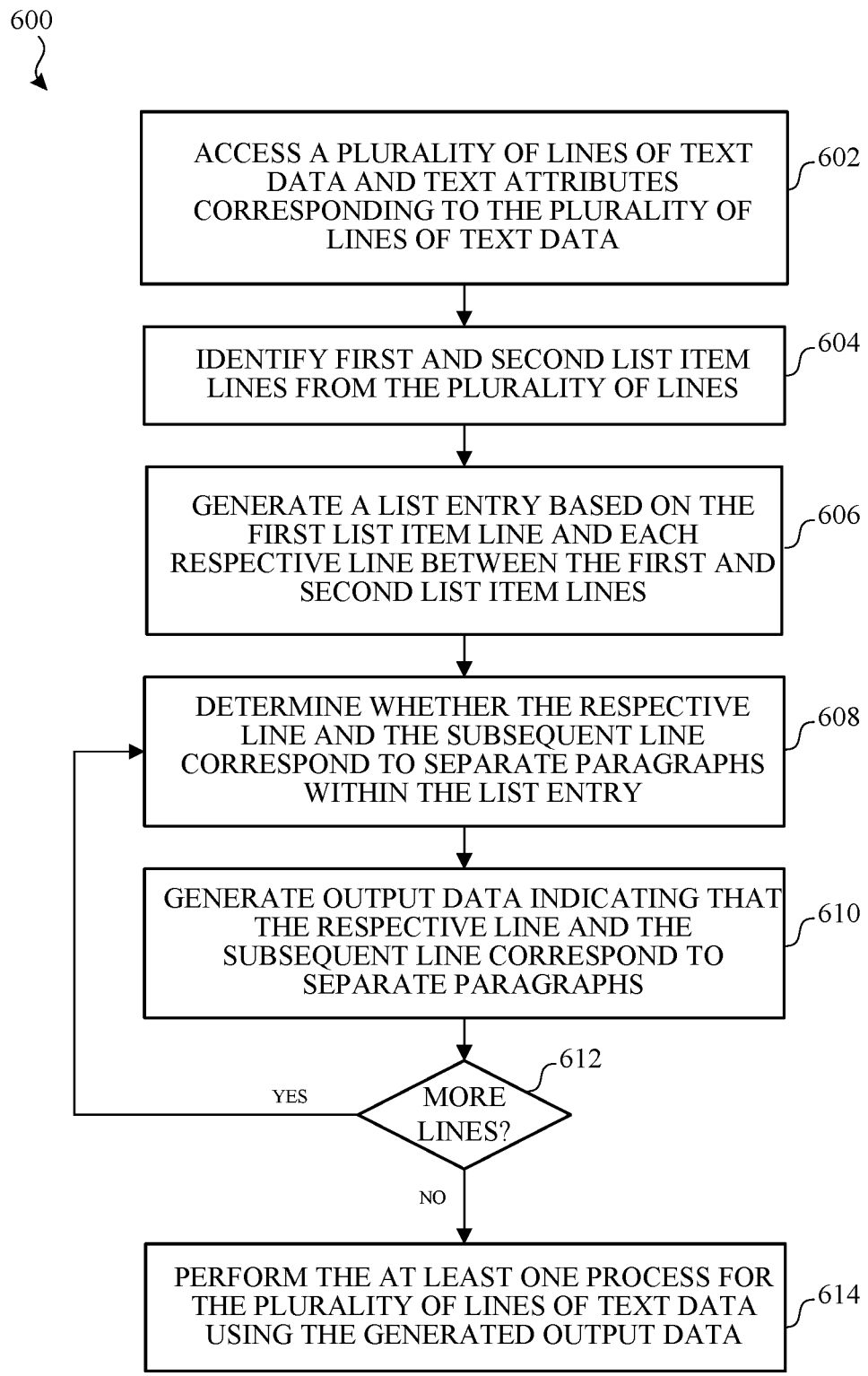
FIG. 6 depicts a flow diagram of an example process for processing text data having a list, in accordance with one or more implementations.

FIG. 6 depicts a flow diagram of an example process 600 for processing text data having a list, in accordance with one or more implementations. For explanatory purposes, the process 600 is primarily described herein with reference to the electronic device 102 of FIG. 1. However, the process 600 is not limited to the electronic device 102, and one or more blocks of the process 600 may be performed by one or more other components of the electronic device 102 and/or other suitable devices. Further, for explanatory purposes, the blocks of the process 600 are described herein as occurring sequentially or linearly. However, multiple blocks of the process 600 may occur in parallel. In addition, the blocks of the process 600 need not be performed in the order shown and/or one or more blocks of the process 600 need not be performed and/or can be replaced by other operations. In one or more implementations, an application stored on the electronic device 102 performs the process 600 by calling APIs provided by the operating system of the electronic device 102. In one or more implementations, the operating system of the electronic device 102 performs the process 600 by processing API calls provided by the application stored on the electronic device 102. In one or more implementations, the application stored on the electronic device 102 fully performs the process 600 without making any API calls to the operating system of the electronic device 102.

At block 602, a plurality of lines (e.g., lines 422-488) of text data (e.g., text data 400) may be accessed. An electronic device (e.g., the electronic device 102) may access the plurality of lines and/or the corresponding text attributes from a data structure, such as a file. In one or more implementations, accessing the plurality of lines may include receiving a file, recognizing text data, and accessing the recognized text data. For example, the electronic device may receive an image of an object having text, perform text recognition on the image (e.g., via an image processing algorithm), and access the text data from the image having recognized text. As another example, a server (e.g., the server 104) may receive an image of an object having text and perform text recognition on the image (e.g., via an image processing algorithm), and the electronic device may access the text data via the server.

At block 604, first and second list item lines (e.g., line 436 and line 448) from the plurality of lines (e.g., lines 422-488) are identified. List item lines are lines that begin with a list item indicator. For example, list item lines of unenumerated lists begin with a list item indicator that is a bullet, a dash, an asterisk, or any other symbol common between each list item line within a list. As another example, list item lines of enumerated lists begin with a list item indicator that is a number, a letter, or any other sequential symbol common between each list item line within a list (e.g., line 436 and line 448 begin with a number).

At block 606, a list entry is generated based on the first list item line and each respective line between the first and second list item lines. A first list item line may contain a plurality of lines, and thus the first and second list item lines may be separated by several lines of text (e.g., lines 438-446 between line 436 and line 448). Lines of text between the first and second list item lines may be part of the list (e.g., lines 438-442 between line 436 and line 448), part of a separate list (e.g., a sub-list at lines 444-446), or not part of the list or a separate list. In one or more implementations, the first and second list item lines may have no lines of text between them. In which case, a list item entry may be generated for the first list item line and the second list item line and may proceed to the next set of list item lines (e.g., by skipping block 608).

At block 608, it may be determined whether the respective line and the subsequent line correspond to separate paragraphs within the list entry. The determination may be based on a first of the text attributes that corresponds to the respective line with a second of the text attributes that corresponds to the subsequent line. The determination may be made by an ensemble of heuristics, a trained machine learning model, or any suitable method to determine whether the lines belong to separate paragraphs as described with respect to the process 500 above. If two lines of text (e.g., the respective and subsequent lines) belong to separate paragraphs, a line space (e.g., a line break) may be inserted between the two lines of text. If two lines of text belong to the same paragraphs, a space (e.g., a space character) may be inserted (or replace an existing line break) between the two lines of text.

At block 610, output data may be generated for the plurality of lines. The output data may indicate which lines of the plurality of lines of the text data correspond to separate paragraphs and/or separate lists. For example, the output data may be instructions for merging lines or metadata that identify lines as belonging to the same paragraph and/or list. The output data may be generated by one or more machine learning models, heuristics, or any other suitable methods for determining whether a space (e.g., a line break or space character) should be inserted between two lines of text (e.g., the respective and subsequent lines). Additionally or alternatively, the output data may include the lines of text corresponding to the indication of which lines of the plurality of lines of text data correspond to separate paragraphs and/or lists. In one or more implementations, the output data includes the lines of text having line breaks added or removed as appropriate to place the lines in separate paragraphs and/or lists as well as lines of text having space characters added or removed as appropriate to place the lines in the same paragraph. In one or more implementations, the output data may be incrementally generated such that more data is added to the output data as the process 600 iterates through each line of the plurality of lines of the text data.

At block 612, it is determined whether there are more lines to analyze between the first and second list item lines. In one or more implementations, one or more lines between the first and second list item lines may correspond to a separate list (e.g., a sub-list), in which case the process 600 is recursively performed for the first a second list item lines of the sub-list. In one or more implementations, there may be no second list item line (e.g., because the process 600 has reached the last item on the list). In which case the remainder of the text data may be analyzed according to process 500 or process 600, as appropriate.

At block 614, at least one process may be performed for the plurality of lines of the text data using the generated output data. In one or more implementations, the plurality of lines of the text data may be modified according to the output data and copied to a clipboard. For example, the output data may include metadata describing which lines belong to the same paragraph and/or list and the plurality of lines of text data may be modified by adding or removing line breaks or space characters between lines as necessary to place lines in the same paragraph and/or list according to the metadata.

In one or more implementations, a process may be a copy/paste operation. For example, a user may select one or more lines of text, or portions thereof, and execute a copy operation (e.g., the copy operation 390) thereby copying the selection to a clipboard. The selection may have line breaks inserted or removed as necessary to place lines within the selection in separate paragraphs as shown in the text data. The selection may also or instead have metadata that indicates that lines within the selection belong in separate paragraphs. When a paste operation (e.g., the paste operation 394) is performed, the selection may be pasted such that the selection is arranged in paragraphs and lists indented as shown in the text data (e.g., as laid out in an image).

In one or more implementations, the output data may be provided to an application or a system process. An application or system process may include a file. For example, the output data may be written to a text file with list formatting applied to list items of the output data. An application or system process may also or instead include a data structure. For example, the output data may be written to a buffer in memory. An application or system process may also or instead include a translation process. For example, a machine learning model trained to translate a first language to a second language may receive as input the output data including text data in the first language and output the text data in the second language, where the list item line indicators may also be translated into the second language. An application or system process may also or instead include a dictation process. For example, the output data may correspond to text data in an audio format and be used as an input to a machine learning model trained to convert speech to text, where each list item in a list is read with pauses between each list item rather than as a whole paragraph. An application or system process may also or instead include a narration process. For example, the output data may be used as input to a machine learning model trained to convert text into an audio format in accordance with the output data, where the audio reads the text as a list, taking pauses between each list item, rather than reading each item continuously. An application or system process may also or instead include a virtual assistant process. For example, the output data may be used as a request to a virtual assistant that processes the request. In one or more implementations, the processes may be incorporated with one another. For example, the narration process may receive the output data for narration and pass it to the audio generation process to generate an audio file for narrating the text data corresponding to the output data.

As described above, one aspect of the present technology is the gathering and use of data available from specific and legitimate sources for processing text data. The present disclosure contemplates that in some instances, this gathered data may include personal information data that uniquely identifies or can be used to identify a specific person. Such personal information data can include demographic data, location-based data, online identifiers, telephone numbers, email addresses, home addresses, images, videos, audio data, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for processing text data. Accordingly, the use of such personal information data may facilitate transactions (e.g., online transactions). Further, other uses for personal information data that benefit the user are also contemplated by the present disclosure. For instance, health and fitness data may be used, in accordance with the user's preferences to provide insights into their general wellness or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of processing text data, the present technology can be configured to allow users to select to "opt-in" or "opt-out" of participation in the collection of personal information data during registration for services or anytime thereafter. In addition to providing "opt-in" and "opt-out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed implementations, the present disclosure also contemplates that the various implementations can also be implemented without the need for accessing such personal information data. That is, the various implementations of the present technology are not rendered inoperable due to the lack of all or a portion of such personal information data.

Figure 7:
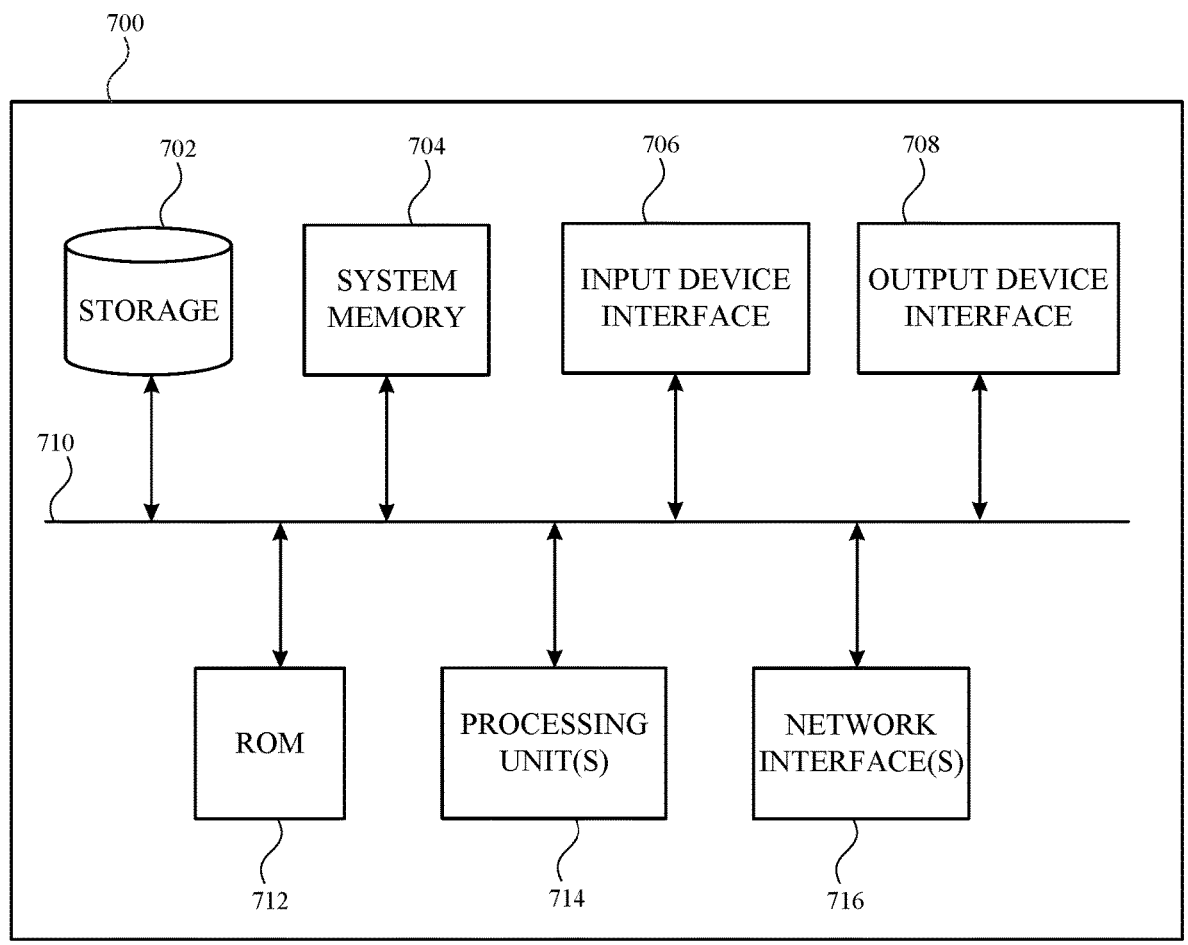
FIG. 7 depicts an example electronic system with which aspects of the present disclosure may be implemented, in accordance with one or more implementations.

FIG. 7 depicts an example electronic system 700 with which aspects of the present disclosure may be implemented, in accordance with one or more implementations. The electronic system 700 can be, and/or can be a part of, any electronic device for generating the features and processes described in reference to FIGS. 1-9, including but not limited to a laptop computer, tablet computer, smartphone, and wearable device (e.g., smartwatch, fitness band). The electronic system 700 may include various types of computer-readable media and interfaces for various other types of computer-readable media. The electronic system 700 includes one or more processing unit(s) 714, a persistent storage device 702, a system memory 704 (and/or buffer), an input device interface 706, an output device interface 708, a bus 710, a ROM 712, one or more processing unit(s) 714, one or more network interface(s) 716, and/or subsets and variations thereof.

The bus 710 collectively represents all system, peripheral, and chipset buses that communicatively connect the numerous internal devices of the electronic system 700. In one or more implementations, the bus 710 communicatively connects the one or more processing unit(s) 714 with the ROM 712, the system memory 704, and the persistent storage device 702. From these various memory units, the one or more processing unit(s) 714 retrieves instructions to execute and data to process in order to execute the processes of the subject disclosure. The one or more processing unit(s) 714 can be a single processor or a multi-core processor in different implementations.

The ROM 712 stores static data and instructions that are needed by the one or more processing unit(s) 714 and other modules of the electronic system 700. The persistent storage device 702, on the other hand, may be a read-and-write memory device. The persistent storage device 702 may be a non-volatile memory unit that stores instructions and data even when the electronic system 700 is off. In one or more implementations, a mass-storage device (such as a magnetic or optical disk and its corresponding disk drive) may be used as the persistent storage device 702.

In one or more implementations, a removable storage device (such as a floppy disk, flash drive, and its corresponding disk drive) may be used as the persistent storage device 702. Like the persistent storage device 702, the system memory 704 may be a read-and-write memory device. However, unlike the persistent storage device 702, the system memory 704 may be a volatile read-and-write memory, such as RAM. The system memory 704 may store any of the instructions and data that one or more processing unit(s) 714 may need at runtime. In one or more implementations, the processes of the subject disclosure are stored in the system memory 704, the persistent storage device 702, and/or the ROM 712. From these various memory units, the one or more processing unit(s) 714 retrieves instructions to execute and data to process in order to execute the processes of one or more implementations.

The bus 710 also connects to the input device interfaces 706 and output device interfaces 708. The input device interface 706 enables a user to communicate information and select commands to the electronic system 700. Input devices that may be used with the input device interface 706 may include, for example, alphanumeric keyboards, touch screens, and pointing devices (also called "cursor control devices"). The output device interface 708 may enable, for example, the display of images generated by electronic system 700. Output devices that may be used with the output device interface 708 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 710 also couples the electronic system 700 to one or more networks and/or to one or more network nodes through the one or more network interface(s) 716. In this manner, the electronic system 700 can be a part of a network of computers (such as a LAN, a wide area network ("WAN"), an Intranet, or a network of networks, such as the Internet). Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessors or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, one or more implementations, one or more implementations, an embodiment, the embodiment, another embodiment, one or more implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving, by an electronic device, an input corresponding to a selection of an image containing text or of a text item, and a command causing the selection to be analyzed by the electronic device to determine formatting information for the selection;
   accessing, by the electronic device, a plurality of lines of text data and text attributes corresponding to the plurality of lines of the text data from the selection, wherein the text attributes comprise semantic information corresponding to text-based features;
   for each respective line of the plurality of lines of the text data, determining whether the respective line and a subsequent line correspond to separate paragraphs within the text data based on a first of the text attributes that corresponds to the respective line of the plurality of lines with a second of the text attributes that corresponds to the subsequent line of the plurality of lines;
   generating output data for the plurality of lines, wherein the output data indicates which lines of the plurality of lines of the text data correspond to separate paragraphs; and
   performing at least one process for the plurality of lines of the text data using the generated output data.

2. The method of claim 1, wherein accessing the text attributes includes receiving the image that includes the plurality of lines of the text data and generating one or more bounding boxes associated with one or more lines of the plurality of lines of the text data.

3. The method of claim 1, wherein the text attributes include the semantic information and geometric information.

4. The method of claim 3, wherein the semantic information includes one or more of punctuation, symbols, capitalization, a word count, and part of speech tags.

5. The method of claim 3, wherein the geometric information includes one or more of a line starting location, a line height, a line spatial orientation, a line length, and a line spacing.

6. The method of claim 1, further comprising:
   determining a language corresponding to the text data; and
   performing the determining based on a reading order that corresponds with the language.

7. The method of claim 1, wherein the output data includes data indicating that the respective line corresponds to a first paragraph and the subsequent line corresponds to a second paragraph.

8. The method of claim 1, wherein performing the at least one process for the plurality of lines of the text data using the generated output data comprises:
   modifying the plurality of lines of the text data using the output data; and
   copying the modified plurality of lines of the text data to a clipboard.

9. The method of claim 1, wherein performing the at least one process for the plurality of lines of the text data using the generated output data comprises copying the plurality of lines of the text data to a clipboard in association with the output data.

10. The method of claim 1, wherein performing the at least one process for the plurality of lines of the text data using the generated output data comprises providing the output data to an application or a system process.

11. The method of claim 1, wherein performing the at least one process for the plurality of lines of the text data using the generated output data comprises providing the output data to one or more of a text file, a data structure, a translation process, a dictation process, a narration process, and a virtual assistant.

12. The method of claim 1, wherein performing the at least one process for the plurality of lines of the text data using the generated output data comprises translating the plurality of lines, in accordance with the output data.

13. The method of claim 1, wherein performing the at least one process for the plurality of lines of the text data using the generated output data comprises generating audio data for the plurality of lines, in accordance with the output data.

14. A method comprising:
receiving, by an electronic device, an input corresponding to a selection of an image containing text or of a text item, and a copy command to copy the selection to a system clipboard;
accessing, by the electronic device, a plurality of lines of text data and text attributes corresponding to the plurality of lines of the text data, the plurality of lines of text data and text attributes corresponding to the selection;
identifying first and second list item lines from the plurality of lines, wherein each of the first and second list item lines begins with a list item indicator;
generating a list entry based on the first list item line and each respective line between the first and second list item lines;
for each respective line of the plurality of lines that is between the first and second list item lines, determining whether the respective line and a subsequent line correspond to separate paragraphs within the list entry based on a first of the text attributes that corresponds to the respective line of the plurality of lines with a second of the text attributes that corresponds to the subsequent line of the plurality of lines;
generating output data for the plurality of lines within the system clipboard, wherein the output data indicates which lines of the plurality of lines of the text data correspond to separate paragraphs; and
performing at least one process for the plurality of lines of the text data using the generated output data, causing the system clipboard to include the selection semantically formatted within the system clipboard.

15. The method of claim 14, wherein accessing the text attributes includes receiving the image that includes the plurality of lines of the text data and generating one or more bounding boxes associated with one or more lines of the plurality of lines of the text data.

16. The method of claim 14, wherein the text attributes include semantic information and geometric information.

17. The method of claim 16, wherein the semantic information includes one or more of punctuation, symbols, capitalization, a word count, and part of speech tags.

18. The method of claim 16, wherein the geometric information includes one or more of a line starting location, a line height, a line spatial orientation, a line length, and a line spacing.

19. The method of claim 14, further comprising:
determining a language corresponding to the text data; and
performing the determining based on a reading order that corresponds with the language.

20. A non-transitory computer-readable medium comprising computer-readable instructions that, when executed by a processor, cause the processor to perform operations comprising:
receiving an input corresponding to a selection of an image containing text or of a text item, and a command causing the selection to be analyzed by the processor to determine formatting information for the selection;
accessing a plurality of lines of text data and text attributes corresponding to the plurality of lines of the text data from the selection, wherein the text attributes comprise semantic information corresponding to text-based features;
for each respective line of the plurality of lines of the text data, determining whether the respective line and a subsequent line correspond to separate paragraphs within the text data based on a first of the text attributes that corresponds to the respective line of the plurality of lines with a second of the text attributes that corresponds to the subsequent line of the plurality of lines;
generating output data for the plurality of lines, wherein the output data indicates which lines of the plurality of lines of the text data correspond to separate paragraphs; and
performing at least one process for the plurality of lines of the text data using the generated output data.

* * * * *